July 29, 1952
J. V. HUNN ET AL
2,605,272
METHOD FOR REMOVING FINES FROM VEGETABLE
OILS AND MISCELLA CONTAINING SAID OILS
Filed Dec. 8, 1948
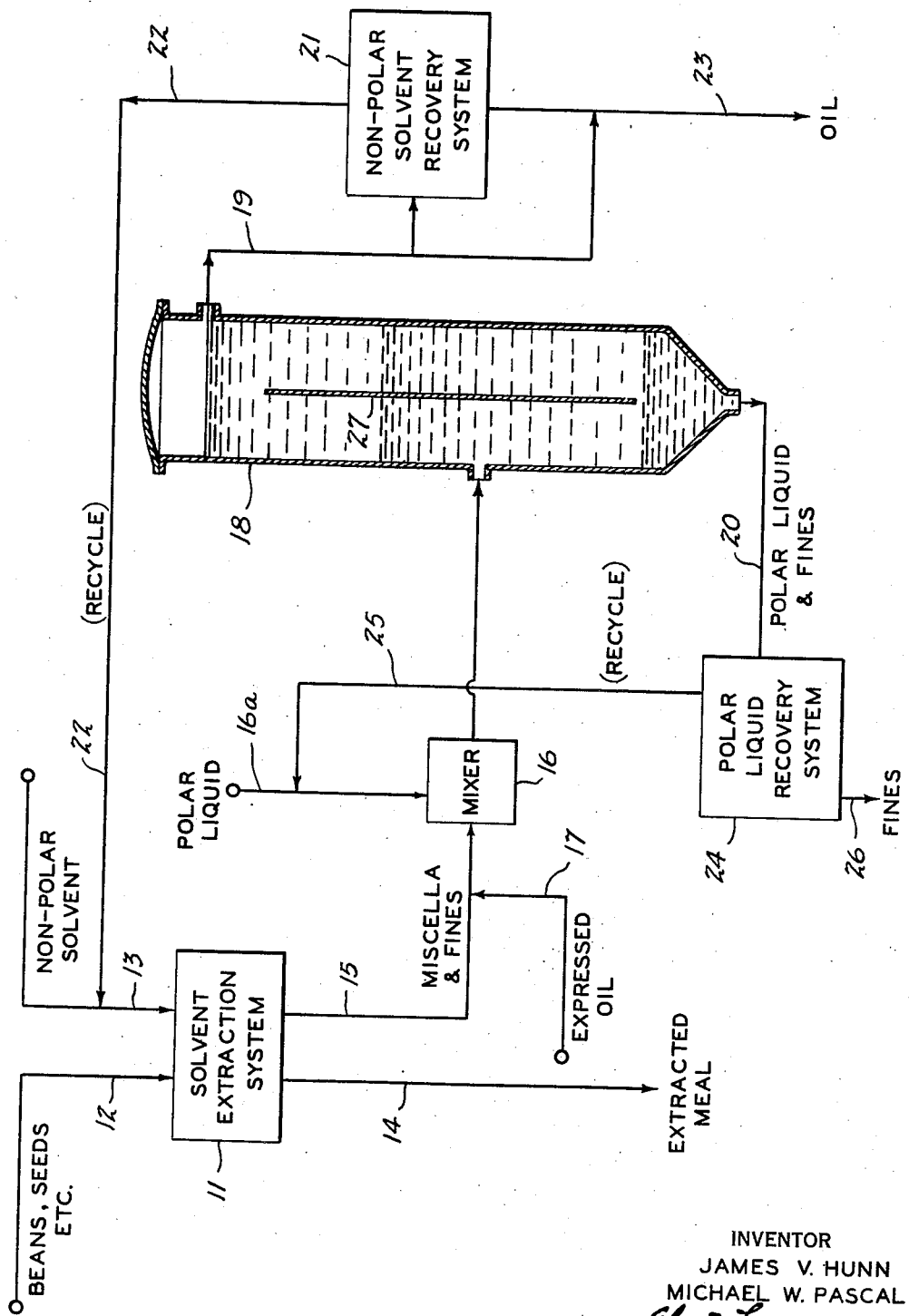
INVENTOR
JAMES V. HUNN
MICHAEL W. PASCAL
BY  *Ely & Frye*
ATTORNEYS Patented July 29, 1952

2,605,272

UNITED STATES PATENT OFFICE 2,605,272

METHOD FOR REMOVING FINES FROM VEGETABLE OILS AND MISCELLA CONTAINING SAID OILS

James V. Hunn, Avon Lake, and Michael W. Pascal, Shaker Heights, Ohio, assignors to The Sherwin-Williams Company, Cleveland, Ohio, a corporation of Ohio Application December 8, 1948, Serial No. 64,142

17 Claims. (Cl. 260—420)

The present invention relates to a method for clarifying liquids containing very fine solid particles and more particularly to a method for removing fine solids from vegetable oils obtained by expression or extraction from oil-bearing beans, seeds, nuts and the like.

For the purpose of this description, the term "seeds" will be used throughout to denote not only seeds, but also beans, nuts and other natural sources of vegetable oils such as cottonseed, castor beans, soya beans, peanuts, flaxseed, hempseed, sunflower seed, oiticica, tungnut, cocoanut and the like. The very fine particles include those of colloidal size as well as those of slightly larger size which are derived from the cellular, cortical and/or proteinaceous constituents of the seeds, and these particles will hereinafter be termed "fines."

When many types of vegetable oils are recovered from their natural source by expression or extraction, there remain in the oil or miscella varying quantities of solid particles. The major proportion of the solid particles, and especially those particles of substantial size, can be and usually are removed from the oil or miscella by conventional separation methods such as by filtering, centrifuging and even by gravitational settling and decantation. However, some of the solid particles are very small and include fines of colloidal or substantially colloidal size. These fines remain suspended in the oil or miscella and are exceedingly difficult to separate therefrom. Filters known as "polishing" filters and the like have been used for removing the fines but they are not too effective since such filters become so rapidly clogged, when more than a minimum amount of fines are present, that all filtering action soon ceases and the filter must be cleaned out. High speed centrifuges are also ineffective since they do not concentrate the colloidal fines. In view of the circumstances, it has been impossible in the past to remove "fines" from an expressed or extracted oil except by a series of tedious inefficient filtering operations or by the use of expensive and complex machinery designed for that purpose. Continuous solid bowl centrifuges have been used with considerable success in separating the bulk of the fines from a miscella obtained by solvent extraction of oil from seeds, but in many instances substantial further clarification is required.

Heretofore, except when using the continuous solid bowl centrifuge system referred to above, it has been necessary to carefully prepare seeds for extraction in order to minimize the production of fines as much as possible. In addition the meal has to be handled very carefully during the extraction process to prevent disintegration of the meal into fines. When extracting soya beans, for example, the standard practice is to carefully flake the beans on flaking rolls and then carry the flakes in baskets during the extraction operation.

In the case of seeds having a high oil content such as flaxseed, forepressing before solvent extraction is generally necessary in order to obtain a firm meal that will not produce an objectionable quantity of fines during the extraction stage.

The present method for removing fines from a miscella permits the seeds to be comminuted into very small particles whereby the solvent extraction thereof is more efficient than in prior extraction processes.

The present invention provides a method for simply and rapidly removing fines from an oil or miscella.

According to the present invention, the oil or miscella containing the fines is treated with an oil-immiscible polar liquid or an aqueous polar solution which wets the fines so that they will be retained in a liquid phase which is substantially immiscible with the oil phase, thereby enabling the aqueous phase containing the fines to be easily separated from the clarified oil phase or miscella.

In the following description, reference will be made to the accompanying drawing which represents a diagrammatic flow sheet of a system for removing fines from an oil or miscella according to the present method.

Referring to the drawing, oil-bearing seeds can be treated in a solvent extraction system 11, which calls for a non-polar solvent, such as a hydrocarbon, for example hexane or heptane or the like. The seeds are introduced into the system at 12, while the solvent can be introduced at 13. The extracted meal is withdrawn at 14 and the miscella, or solvent-oil solution, containing the fines is withdrawn at 15.

The miscella is passed to a mixer 16 where it is thoroughly mixed with a polar liquid, introduced through line 16a, which is immiscible with the miscella. Any type of mixing apparatus may be used including orifice mixers, paddle type agitators and the like.

In place of the miscella, an expressed oil containing fines may be introduced into the mixer 16 through line 17 for mixing with the polar liquid.

After the oil or miscella and polar liquid are completely and thoroughly mixed and agitated in mixer 16, they are passed to a settling tank 18 where the miscella and polar liquid are allowed to separate into two distinct phases, the upper phase consisting of the oil or miscella and the lower phase consisting of the polar liquid, containing substantially all of the fines and other small particles previously contained in the oil. The upper phase is continuously or intermittently withdrawn from the settler 18 through line 19 and the lower phase is withdrawn from the bottom of settler 18 through line 20. If a miscella from a solvent extraction system 11 is introduced into mixer 16, the upper phase, withdrawn through line 19, will consist of the clarified miscella. Normally this miscella will be treated in a solvent recovery system 21 to recover the non-polar solvent for recycling to the solvent extraction system 11 through line 22. Solvent-free clarified oil is withdrawn through line 23. On the other hand, if an expressed oil is introduced into mixer 16, the clarified oil recovered through line 19 may be passed directly to line 23 and used as such or given additional treatments well known in the art.

The lower phase which is withdrawn from the settling tank 18 through line 20 may be passed to a polar liquid recovery system 24 in which the polar liquid is separated from the fines, as for example by distillation, evaporation or by centrifuging or the like. The recovered polar liquid may be recycled to mixer 16 through line 25 and the fines are withdrawn through line 26. If the polar liquid is water alone or a very dilute aqueous solution as described hereinafter, the lower phase containing the fines may be added directly to the extracted meal and passed to a desolventizing stage therewith.

The settling tank 18 may be of any desired type in which the mixed liquids can continuously separate into two phases. As shown in the drawing, a vertical baffle plate 27 is provided in the center of tank 18 in order to break the flow of incoming liquids. It is also possible to introduce the incoming liquids tangentially of the tank 18 without the use of a baffle plate. The polar liquid and the non-polar liquid (oil or miscella), when introduced into tank 18, immediately begin to separate into two separate phases and the non-polar liquids will rise to form an upper phase and the polar liquid, due to its greater specific gravity, will flow to the bottom of the tank to form the lower phase.

According to the present invention, we have found that the fines contained in an oil or miscella are hydrophilic and are more easily wetted by polar liquids or aqueous polar solutions than by the non-polar solvents which are normally used in a solvent extraction system or, in the case of an expressed oil, by the oil itself. When the oil is completely and thoroughly mixed with the polar liquid, the fines are preferentially wetted by the latter liquid so that when this liquid separates into the lower phase, the fines are carried therewith, thus leaving a clarified oil or miscella as the upper phase. This method produces brilliantly clear oils and miscellas in a simple and economical manner. Many tedious filtering operations were often previously required in order to obtain an oil having similar clarity. Also a higher yield of oil is obtainable by the present process since in the previous filtering operations a relatively high percentage of the oil was always lost to the filter cake, even when the cake was washed with an excess of the solvent for the oil. With the present method, residual oil remaining with the fines is negligible.

The polar liquids which have been found to be useful in the present method are water, low molecular weight aliphatic monohydric alcohols having not more than 4 carbon atoms, such as methyl, ethyl, propyl and isopropyl alcohol, water and alcohol solutions, aqueous solutions of various low molecular weight organic acids, such as acetic, citric, lactic, oxalic and the like, various commercial wetting agents, such as dioctyl ester of sodium sulfosuccinic acid, known as Aerosol O. T., and other known wetting agents, and sulfonated alcohols as well as water soluble fatty acid soaps such as sodium palmitate and sodium stearate and the like. In addition water soluble ethers, such as dioxane, dihydric alcohols, such as propylene glycol, and various ether alcohols may be used if desired.

In the case of the alcohols, it has been found that ethyl alcohol, propyl alcohol or isopropyl alcohol can be used satisfactorily. Methyl alcohol can also be used but, due to its greater volatility and toxicity, it presents practical difficulties which render it less satisfactory than ethyl alcohol. Alcohols having a higher molecular weight than the propyl alcohols are generally not suitable in the present process since they are not sufficiently volatile, are usually not completely soluble in water, and require increased temperatures for recovery from the fines for reuse in the system.

It has been found that aqueous solutions of ethyl alcohol and isopropyl alcohol are particularly suitable for the removal of fines from an oil by the method of the present invention. However, if it is desired not to remove fatty acids from the oil, it is generally necessary to limit the concentration of the alcohol in water solution since the fatty acids are soluble in concentrated aqueous alcohol solutions. In the case of aqueous solutions of ethyl alcohol, isopropyl alcohol and the like, the concentration should not be greater than about 80% alcohol.

The use of an acid, an alcohol or aqueous acidic or alcoholic solutions for removing fines from an oil or a miscella performs an additional function by tending to coagulate the fines when they are of proteinaceous character. Such coagulation facilitates the separation of the wetted fines from the non-polar liquids in the settling tank 18 and also facilitates the separation of the fines from the polar liquid in the recovery system 24.

As stated above, water alone may be used as the polar liquid for clarifying oils or miscellas. However, when water alone is used, it has been found that a longer period of agitation and mixing with the oil or miscella is required for obtaining sufficient dispersion of the water through the oil to contact and wet the fines. This is believed to be due to the fact that water has a higher interfacial tension with the miscella than, for example, an aqueous solution of a wetting agent. When water alone or very dilute aqueous solutions are used for clarifying certain oils, such as linseed, especially when there are substantial quantities of fines and solid particles present, for example above about 5% by weight, the total quantity of water used for clarification should not exceed that amount which will cause excessive swelling and dispersion of the mucins and mucilagenous materials in the solids. Such swelling produces a thick viscous paste-like mass which cannot be handled conveniently. On the other hand, when aqueous alcohol solutions are used as the polar liquid, for example solutions having a concentration of from about 60% to about 40% alcohol, no such difficulties occur even when 50% to 75% polar liquid is used since the mucins are insoluble therein.

When aqueous solutions of polar wetting agents are used, the concentration of the wetting agent in the solution must be controlled to satisfy, as nearly as possible, two factors. The first and more important factor relates to the solvent power of the polar liquid for the non-polar liquids, whereas the second factor relates to the interfacial tension of the polar liquid.

To meet the first mentioned factor, the polar wetting agent should be diluted with sufficient water to decrease the solvent power of the wetting agent for oil or miscella to an insignificant value while the second mentioned factor calls for dilution with a minimum quantity of water so as to obtain as low an interfacial tension as possible while at the same time complying with the first factor. For example, if a highly concentrated aqueous solution of an alcohol were used for clarifying a miscella composed of an oil and heptane, the heptane acts in the nature of a mutual solvent for the oil and the alcohol so that the aqueous solution might contain small quantities of the heptane and oil. Occasionally it is necessary to add relatively large quantities of water to the wetting agent in order to reduce the solvent power of the aqueous polar solution for oil to a negligible value, thus raising the interfacial tension to a value which is higher than would be normally desired. Such aqueous solution may nevertheless be used in the present invention provided the mixture of polar solution and the oil or miscella are mixed with sufficient agitation and for such a period of time as to ensure wetting of all of the fines.

The quantity of polar liquid to be mixed with the oil or miscella depends upon the concentration of fines in the oil or miscella and also on the length of time of agitation. Small quantities of the polar liquid can be used, i. e. about 1 or 2% by volume to effect substantially complete removal of colloidal fines if the mixture is agitated for 10 minutes or more. However, when from about 5% to about 10% by volume of the polar liquid is used, only about 1 or 2 minutes' agitation is required to obtain substantially complete clarification of the oil.

Another factor to be considered is that the polar solution must not have such high wetting properties that it will cause an emulsion to form when it is agitated with the oil or miscella. Such an emulsion would prevent separation of the two phases and would require the use of an additional reagent to break the emulsion before phase separation could be obtained. When possible, it is desirable to use a polar solution having as high a density as possible, taking into account the interfacial tension and oil solubility conditions, since this permits more rapid separation of the two phases.

Reference will now be made to several examples of the method in which a miscella of linseed oil and hexane was clarified by treatment with different polar solutions for removal of the fines. The miscella comprised 20% oil by volume, 0.5% fines and the balance hexane.

*Example I*

10% by volume of an aqueous alcohol solution containing 80% ethyl alcohol was added to the linseed oil miscella. This mixture was stirred rapidly for five minutes so that the two immiscible phases were thoroughly mixed. The mixture was allowed to stand and after approximately 2 minutes, the alcohol solution together with the fines formed a distinct lower phase and the miscella, free from all visible fines, formed an upper phase.

*Example II*

2% by volume of a 5% solution of lactic acid in water was added to the linseed oil-hexane miscella. After the same treatment as described in Example I, a lower phase containing the fines and a clear upper phase of miscella were formed.

*Example III*

2% by volume of a 2% solution of a water soluble fatty acid soap was added to the miscella and after the same treatment as in Example I, a clear upper phase of miscella separated from a lower phase in which the fines were concentrated.

*Example IV*

2% by volume of a .005% solution of Aerosol O. T. in water was added to the miscella. After the same treatment as described in Example I, an aqueous lower phase containing the fines and a clear upper phase of miscella were formed.

*Example V*

A soy bean oil and hexane miscella, containing 20% oil and considerable soy bean meal fines was mixed with 5% of an 80% aqueous ethyl solution. The mixture was thoroughly mixed and agitated for 5 minutes and then allowed to settle for 2 minutes. The fines were completely wetted by the aqueous alcohol solution and rapidly settled to the bottom, leaving a brilliantly clear miscella free from fines on top.

It is also possible to remove not only the fines but also the larger and coarser solid particles by the present method. It is, therefore, not necessary to remove the larger particles if they are present, before treating the oil or miscella with the aqueous polar liquid. If desired, finely ground seed may be treated directly with a solvent for the oil, such as hexane or heptane and a polar liquid as shown in the following example.

*Example VI*

100 grams of finely ground flaxseed were mixed with 120 grams of hexane and agitated for 15 minutes. Then 150 grams of a 92½% ethyl alcohol solution were added and the mixture thoroughly agitated for 5 minutes. After agitation, the mixture was allowed to settle for approximately 5 minutes during which time a perfectly clear oil-hexane miscella collected as the upper phase. The meal, including the fines, was completely collected in the lower aqueous alcohol phase. Analysis showed that the miscella had a concentration of 20% oil. This corresponded with the theoretical value obtainable by complete extraction of the oil in the flaxseed.

It will be understood that the foregoing examples are merely illustrative and are not to be construed as limitations on the scope of the present invention which is defined in the appended claims. It will be clear to one skilled in the art that the method of the present invention may be carried out in various different ways and that the accompanying diagrammatic flow sheet represents only a suggested way of practicing the invention.

What is claimed is:

1. A method for removing fines from an oily liquid of the group consisting of vegetable oils and solutions of said oils in essentially water immiscible aliphatic solvents therefor, and containing a substantial quantity of fines which comprises intimately mixing therewith an aqeous solution of an organic hydrophilic dispersion agent, the proportion of said dispersion agent in said aqueous solution being sufficient to lower the surface tension of said aqueous solution to enable wetting of the fines and insufficient to cause said aqueous solution to form a stable emulsion with said oily liquid, and subsequently separating the oily liquid substantially free of fines from the aqueous solution containing substantially all of the fines.

2. A method as claimed in claim 1 wherein said dispersion agent consists of at least one compound selected from the group consisting of low molecular weight aliphatic monohydric alcohols, low molecular weight aliphatic acids, sulfonated alcohols, water soluble fatty acid soaps, water soluble ethers, dihydric alcohols, ether alcohols, and dioctyl ester of sodium sulfosuccinic acid.

3. A method as claimed in claim 1 wherein the oily liquid and the aqueous solution are separated by quiescent stratification.

4. A method as claimed in claim 1 wherein the dispersion agent comprises an alcohol.

5. A method as claimed in claim 4 wherein the concentration of the alcohol in the aqueous solution is not greater than about 80%.

6. A method as claimed in claim 4 wherein the alcohol is a low molecular weight aliphatic alcohol.

7. A method as claimed in claim 6 wherein the alcohol is isopropyl alcohol.

8. A method as claimed in claim 1 wherein the dispersion agent comprises a low molecular weight organic acid.

9. A method as claimed in claim 8 wherein the organic acid is lactic acid.

10. A method as claimed in claim 1 wherein the dispersion agent comprises a water soluble fatty acid soap.

11. A method as claimed in claim 10 wherein the fatty acid soap is sodium palmitate.

12. A method as claimed in claim 1 wherein the dispersion agent comprises a sulfonated alcohol.

13. A method as claimed in claim 1 wherein the dispersion agent comprises the dioctyl ester of sodium sulfosuccinic acid.

14. A method of removing fines from a miscella comprising an extracted vegetable oil and a water immiscible aliphatic solvent therefor said miscella containing a substantial quantity of fines comprising thoroughly mixing said miscella with an aqueous solution of an organic hydrophilic dispersion agent, said solution having a surface tension lower than said miscella and higher than that which would produce a stable emulsion with said miscella, allowing said mixed liquids to form separate phases, one of said phases comprising the aqueous solution and substantially all of the fines and the other of said phases comprising the miscella substantially free of fines and separating said phases.

15. A method as claimed in claim 14 wherein the miscella is mixed with from about 1% to about 10% by volume of the aqueous solution.

16. A method as claimed in claim 15 wherein the miscella is mixed with from about 5% to about 10% by volume of the aqueous solution.

17. A method as claimed in claim 14 wherein the aqueous solution has a density higher than that of said miscella.

JAMES V. HUNN.
MICHAEL W. PASCAL.

REFERENCES CITED

The following references are of record in the file of this patent:

UNITED STATES PATENTS

| Number | Name | Date |
|---|---|---|
| 2,069,187 | Kraybill | Jan. 26, 1937 |
| 2,205,971 | Clayton et al. | June 25, 1940 |
| 2,260,731 | Thurman | Oct. 28, 1941 |
| 2,390,528 | Freeman | Dec. 11, 1945 |
| 2,525,702 | Mattikow | Oct. 10, 1950 |

FOREIGN PATENTS

| Number | Country | Date |
|---|---|---|
| 252,370 | Great Britain | May 18, 1926 |
| 289,801 | Great Britain | Jan. 3, 1929 |